United States Patent [19]

White

[11] 4,264,044
[45] Apr. 28, 1981

[54] OPERATING STATION FOR AIRCRAFT REFUELING BOOM

[75] Inventor: Thomas H. White, Issaquah, Wash.

[73] Assignee: The Boeing Company, Seattle, Wash.

[21] Appl. No.: 644

[22] Filed: Jan. 2, 1979

Related U.S. Application Data

[63] Continuation-in-part of Ser. No. 865,833, Dec. 30, 1977, Pat. No. 4,160,534.

[51] Int. Cl.$^3$ .............................................. B64D 39/00
[52] U.S. Cl. ............................ 244/135 A; 244/118.6; 244/129.3
[58] Field of Search ........... 244/135 A, 135 R, 118 P, 244/118 R, 129.3, 122 R, 121, 3; 35/12 R, 12 B, 12 H, 12 N, 12 W; 89/37.5 R; 350/301, 302, 307; 297/232, 241, 257, 346

[56] References Cited

U.S. PATENT DOCUMENTS

| | | | |
|---|---|---|---|
| 2,859,002 | 11/1958 | Leisy | 244/135 A X |
| 4,160,534 | 7/1979 | White | 244/135 A |

OTHER PUBLICATIONS

"KC-10," McDonnell Douglas Corporation, Sep., 1978.

*Primary Examiner*—Galen L. Barefoot
*Attorney, Agent, or Firm*—Hughes, Barnard & Cassidy

[57] ABSTRACT

A refueling boom operator's seat located within the lower rear portion of the aircraft fuselage, the seat positioning the operator in a moderately reclining sitting position facing rearwardly to view the operating area of the refueling boom. A leg well structure which extends rearwardly through and beyond a rear pressure bulkhead to accommodate the operator's legs, and a viewing window provided in an aperture defined by the rear pressure bulkhead is positioned above the operator's legs at approximately the position of the operator's knees. These components are so arranged relative to the main rear pressure bulkhead and other components of the fuselage that the operator has a direct unobstructed view of the boom's normal refueling envelope. A pair of mirrors at the upper and lower portion of the viewing window envelope provide a view of the area into which the boom is able to move above its normal refueling area.

18 Claims, 5 Drawing Figures

OPERATING STATION FOR AIRCRAFT REFUELING BOOM

CROSS-REFERENCE TO RELATED APPLICATION

This is a continuation-in-part of my copending application, Ser. No. 865,833, filed Dec. 30, 1977, entitled "Operating Station for Aircraft Refueling Boom," now U.S. Pat. No. 4,160,534.

BACKGROUND OF THE INVENTION

A. Field of the Invention

The present invention relates to an operating station for an aircraft particularly adapted for operation of an aircraft refueling boom.

B. Brief Description of the Prior Art

The usual method of aerial transfer of fuel from a tanker aircraft to a receiver aircraft involves the use of a refueling boom which is pivotally mounted by a gimbal device to the lower rear end of the tanker. At the outer end of the boom there is provided an aerodynamic control apparatus (i.e. a ruddevator assembly) which is controlled by an operator positioned in the aircraft at a location proximate the inner pivot end of the boom. In effect, the operator manipulates the ruddevator through appropriate controls to "fly" the boom into position for proper rendezvous with the receiver aircraft, so that the boom outlet can be properly positioned in the inlet receptacle of the receiving aircraft. During refueling, there will be some relative movement between the two aircraft, so the operator continues to "fly" the boom during the refueling operation so that the boom follows the receiving aircraft without transmitting excessive lateral loads to the boom. The limits within which the boom is designed to be moved angularly during the refueling operation is called the "refueling envelope."

In the operating stations which are now commonly in use for refueling operations, the operator lies on his stomach facing rearwardly, with his chin supported on a "doughnut-like" cushion. From this position, the operator views the discharge end of the boom and operates a pair of hand controls to manuever the boom to its proper position. One of the advantages of this arrangement is that it enables the operator to be positioned so that the operator's head is near the skin at the lower portion of the fuselage so that the dimensions of the viewing window can be kept relatively small and yet afford the operator a relatively wide view of the refueling area. Another advantage is that it is possible to locate the operator's sight along a line reasonably close to the lengthwise axis of the boom so that the operator is more nearly "looking along" the length of the boom. Not only does this give the operator a better perspective in making the initial hook-up, but it better enables him to detect any "bowing" of the boom, which would indicate that undesired lateral forces are being exerted on the boom by the receiver aircraft.

However, correctly controlling a refueling boom is a precision operation requiring a great deal of skill. Unfortunately not only is this prone position somewhat awkward, but when the refueling operation extends over a period of time, this arrangement is more conducive to operator fatigue, which in turn tends to degrade the operator's ability to maneuver the boom with precision. Also, when a second person is positioned in the refueling boom operating station (e.g. in a situation where there is an observer or an instructor), the operation becomes particularly cumbrous. The second person must also assume a prone position to one side or the other of the operator. To get a view of both lateral extremes of the operating area of the boom, it's necessary for the second person to somehow move his head over the prone body of the operator.

Accordingly, there have been proposals in the prior art to modify the operating station so that the operator can be positioned more conveniently without interfering with the precision operation of the boom. It has been recognized that certain advantages would accrue in positioning the operator in a more natural seated position from which he could operate the controls more conveniently and with less fatigue. However, there are physical limitations as to the amount of structural changes which can be incorporated in the lower aft end of the fuselage to make room for an operator in a sitting position and provide the operator with a "window" of sufficiently large areas for proper viewing of the refueling envelope, without causing substantial structural modifications which necessarily result in penalties with regard to weight, cost, etc.

One proposal has been to place the operator at a location further removed from the pivot location of the boom and provide him with auxiliary optical equipment (e.g. television cameras and/or periscope-like devices) to obtain a satisfactory view of the boom operating in the refueling envelope. However, this indirect viewing of the boom tends to cause the operator to loose the proper perspective and diminish the "sense of realism" which direct vision gives. Another proposal has been to position the operator in a "blister-like" structure which protrudes outwardly from the skin of the aircraft. However, this has adverse aspects in terms of cost, weight, and aerodynamic drag. Also there is an undesirable psychological effect in that the operator sometimes feels precariously placed in such an appendage which is outside of the normal fuselage structure. Attempts to move the operator at a further forward location in the fuselage generally result in giving the operator a less advantageous view for precision operation of the boom.

With regard to the prior art disclosed in the patent literature, U.S. Pat. No. 2,663,523, Leisy, discloses an aircraft refueling boom where the operator is located in a seated position in the fuselage moderately to the rear of the pivot mounting of the refueling boom. One of the problems with this particular arrangement is that to give the operator an adequate view of the boom moving to the extreme of its operating limits, a relatively large viewing window is required, which in turn necessitates additional reinforcing structures.

There are also in the prior art patents a number of arrangements for positioning a gunner or an operator of armaments of some sort.

For example, U.S. Pat. No. 2,067,585, Trimback, discloses a gunner seat having a curved track along which the seat moves so that it can be positioned at various angles.

U.S. Pat. No. 2,362,887, Corte, shows another form of a rotatably mounted gunner seat.

U.S. Pat. No. 2,366,410, Klemper et al, shows a gun mounting where the operator is positioned remote from the gun mounting itself, with the operator obtaining a view for operation of the gun through a periscope-like device.

U.S. Pat. No. 2,373,185, Hurley, discloses a particular configuration of a pressurized chamber for an operator of a gun in an aircraft.

U.S. Pat. No. 2,389,997, Pontius 3d, et al, shows a periscope arrangement for a gun turret.

U.S. Pat. No. 2,396,314, shows yet another periscope arrangement through which a gunner can obtain a view for operating aircraft armaments.

Another optical device for sighting of aircraft armaments is shown in U.S. Pat. No. 2,399,676, Holschuh et al.

U.S. Pat. No. 2,938,434, Myron, shows a missile turret at the aft end of an airplane which is operated from a remote position in an aircraft.

Another group of prior art patents show miscellaneous seating arrangements for aircraft pilots or other personnel.

For example, U.S. Pat. No. 1,882,315, Clayton, shows a pilot's seat, the position of which is adjustable to provide an improved view for the pilot in various situations.

U.S. Pat. No. 2,669,284, Pall et al, shows yet another arrangement for a vertically adjustable pilot's seat.

U.S. Pat. No. 3,079,112, Campbell et al, shows a vertically adjustable seat for a pilot which enables the pilot to perform additional duties in the aircraft by moving him to different operating locations.

U.S. Pat. No. 3,190,589, Mennborg, shows an arrangement for an ejection seat for a high speed aircraft.

U.S. Pat. No. 3,826,434, Von Beckh, shows a seat which is adjustable to enable the operator to withstand a high "G" environment.

U.S. Pat. No. 3,981,465 shows a supinaping seat for an aircraft cockpit, in which the pilot is provided with controls positioned on right and left arm rests of the seat.

U.S. Pat. No. 3,994,453, Firestone, shows a seating arrangement where a pilot, flying solo, can fly an airplane having dual controls.

Also shown in the prior art are various arrangements for improving the view of passengers in an aircraft.

U.S. Pat. No. 2,942,811, Bell, shows an aircraft having a window in the floor of the fuselage, with the passenger seats being arranged around the window for a view of the terrain below.

U.S. Pat. No. 3,938,761, discloses an arrangement where the passengers of an aircraft are placed in a forward transparent portion of the fuselage for a rather wide view, and the pilot is placed above, behind the passengers.

U.S. Pat. No. 3,558,209, Trufanoff, et al, provides an optical viewing window for an SST aircraft where the passengers see an image that is presented on a projection screen.

Another group of prior art patents show a variety of optical devices which give the operator of a vehicle a rear view. U.S. Pat. No. 1,841,176, Fromer, shows a rear view mirror placed beneath the floorboard of an automobile to provide a rear view.

U.S. Pat. No. 2,374,027, McMaster et al, shows a periscope-like device designed for use in either an aircraft or a mobile land vehicle, whereby the operator can obtain a rear view.

Another periscope device for automobiles is shown in U.S. Pat. No. 3,127,191, Goldman.

A one-way mirror periscope rear vision system is shown in U.S. Pat. No. 3,827,788, Clark.

U.S. Pat. No. 3,088,537, discloses an operator's cab for a work performing land traveling land vehicle, such as a "log stacker."

It is an object of the present invention to provide an operating station for a refueling boom, in which the operator is placed in a convenient sitting position with an adequate view of the refueling envelope of the boom, which operating station is so arranged as to keep to a practical minimum undesired structural modifications of the basic aircraft structure. It is a further object of the present invention to provide the operating station for a refueling boom in which two or three people, such as an operator and one or two observers or instructors, can function with reasonable convenience.

SUMMARY OF THE INVENTION

The operating station of the present invention is positioned in the fuselage of an aircraft, which fuselage has an outer fuselage skin and a longitudinal center axis, a transverse axis, a forward end, and a rear end. The aircraft has a a refueling boom extending rearwardly from the aircraft, with the refueling boom having an operating envelope (i.e. refueling envelope) within which it performs its refueling functions. The refueling envelope has an upper envelope boundary, a lower envelope boundary and side envelope boundaries.

There is an operator's seat at a lower rear portion of the fuselage. Desirably the seat has a seat platform and a backrest, with the seat being arranged to establish at a predetermined viewing location a rearwardly directed eye reference point for an operator positioned on said seat. There is a leg accommodating structure (i.e. leg well) extending through and beyond the rear pressure bulkhead in a manner to receive the legs of an operator positioned in said seat.

A window structure is positioned rearwardly of the eye reference point and forward of said rear pressure bulkhead at a location above the leg accommodating structure. This window provides a direct viewing area defined by an upper viewing limit, a lower viewing limit, and side viewing limits.

In the preferred form, the seat, the leg accommodating structure and the window structure are positioned and arranged relative to each other and relative to the aperture defined by the rear pressure bulkhead and also relative to the fuselage components and to the operating envelope of the refueling boom, in the following manner:

1. The upper viewing limit of the window structure and the upper edge portion of the aperture defined by the rear pressure bulkhead are located at least as high as a plane extending from the upper envelope boundary to the eye reference point established by said seat location;

2. side portions of the window structure and the aperture defined by said rear pressure bulkhead are located at or outside of planes extending from both of the side envelope boundaries to the eye reference point established by said seat location; and 3. a lower viewing limit of said window structure and a lower edge portion of said aperture defined by said rear pressure bulkhead are located at or below a plane extending from the lower envelope boundary to the eye reference point as established by the seat location.

An instrument panel is positioned rearwardly of the eye reference point and above said window structure at about the same longitudinal location as the window structure. The leg accommodating structure extends rearwardly beyond the location of the instrument panel. Control handles are located for the operator on opposite sides of the seat at convenient arm rest locations. The operator's seat itself can be adjusted moderately both vertically and also along a longitudinal axis to accommodate operators of different body sizes in a manner to provide a constant eye reference point for the operating station.

To provide an auxiliary view of the area above the normal operating envelope of the refueling boom (i.e. the refueling envelope), there is provided an auxiliary viewing device. This comprises a second mirror means located forwardly of said rear pressure bulkhead having a reflective surface extending upwardly, and forwardly at an upper edge of said window structure, and a first mirror means positioned rearwardly of said rear pressure bulkhead at a lower edge of said window structure and having a reflective surface extending downwardly and rearwardly. The two reflective surfaces are so arranged that light from a location immediately above the refueling envelope of the boom is reflected upwardly by the second reflective surface to the first reflective surface, and then to the eye reference point, thus providing an indirect view of the area above the normal refueling envelope.

In the event that a second person is to be positioned in the operating station, there is provided a second seat movable along a "U" shaped track mechanism which extends longitudinally on each side of said operator's seat. This enables a second person and possibly a third person in yet a third seat to position himself or themselves either directly behind or on either side of the operator's seat simply by moving the additional seat or seats along the track. The additional seat or seats are each mounted for rotation about a vertical axis and for horizontal linear movement about their respective bases.

Other features of the invention will become apparent from the following description.

DESCRIPTION OF THE PREFERRED EMBODIMENT

Figure 1:
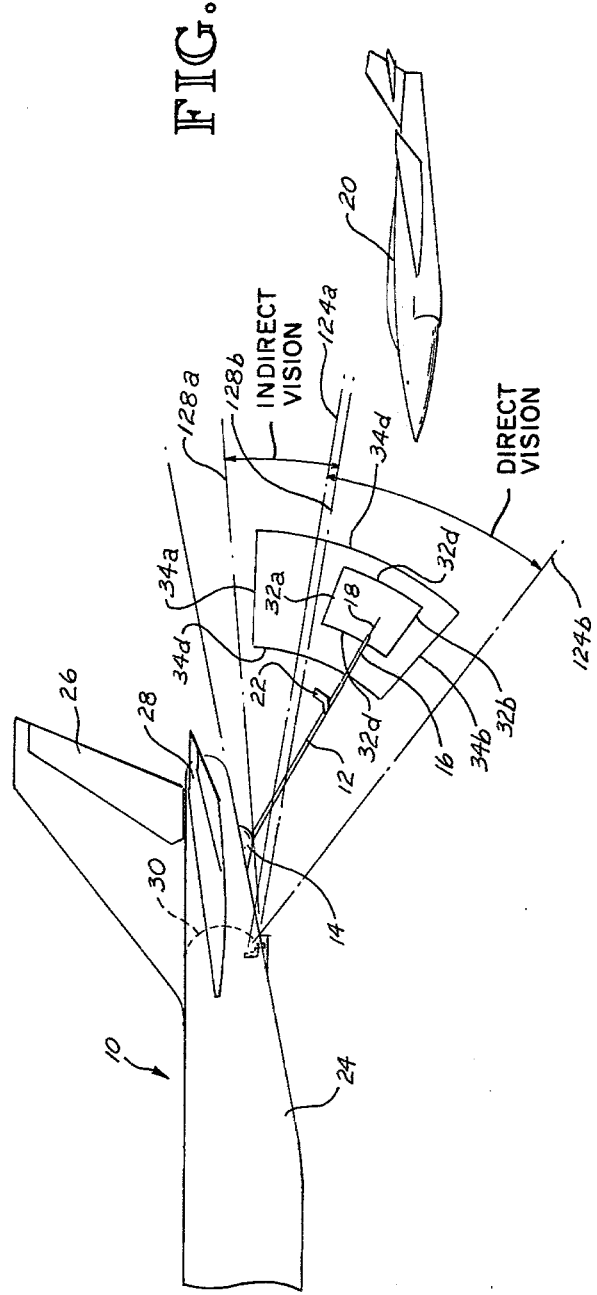
FIG. 1 is a side elevational view of a rear portion of a refueling aircraft incorporating the present invention.
Figure 2:
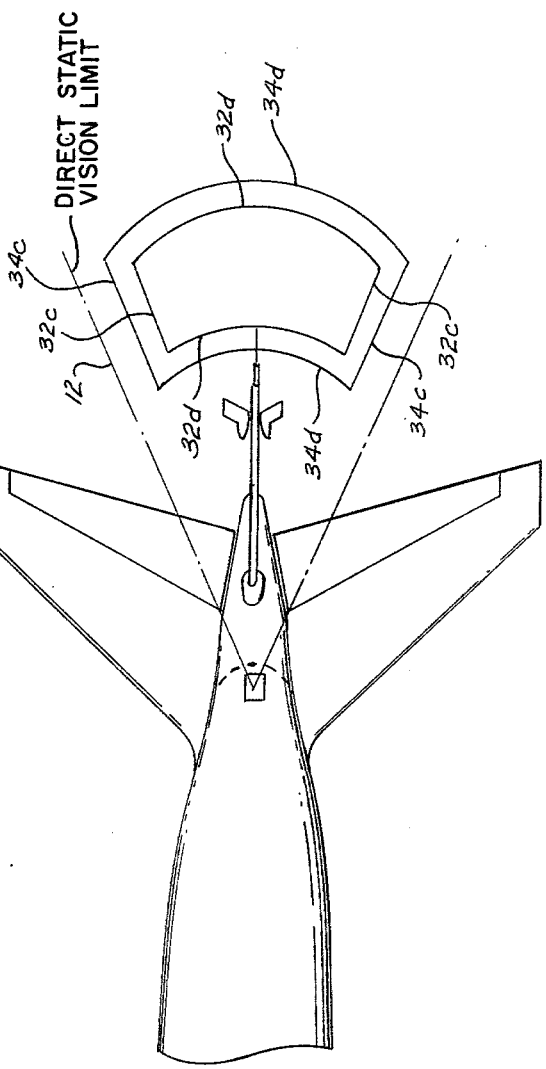
FIG. 2 is a top view thereof.

In FIGS. 1 and 2; there is shown an aircraft tanker 10, having a boom 12 gimbal mounted to the lower rear end of the aircraft at 14, and having at its outer end a refueling probe 16 mounted telescopically within the boom 12. At the outer end of the probe 16, there is a nozzle 18 which upon extension of the probe 16 becomes positioned in an intake receptacle (not shown for convenience of illustration) at the upper forward end of a receiver aircraft, indicated at 20. At the outer end of the boom 12, there is a ruddevator assembly 22 which is utilized to control movement of the boom 12 during a refueling operation.

The aircraft 10 comprises a fuselage 24 having a forward end (not shown for convenience of illustration) and a rear end at which the aircraft is provided with a rudder 26 and elevators 28. Since a major portion of the fuselage 24 is at least in some circumstances pressurized, there is at the rear portion of the fuselage 24 a pressure bulkhead, indicated schematically at 30. For structural reasons (i.e. to withstand the forces produced by the pressurized air within the fuselage with the least amount of structure) this bulkhead 30 is commonly made in the configuration of a portion of a hemisphere. It is desirable that the structure of this bulkhead 30 be interrupted as little as possible (e.g. by forming an opening therein), since this would require extra reinforcing structure for the bulkhead 30, which would in turn mean an increase in weight.

The area at the end of the refueling boom 12 within which the boom 12 operates during refueling is commonly called the "refueling envelope." There is also a "control limit area" which includes the area outside of the refueling envelope within which the boom is able to be moved during flight, without encountering mechanical interference. The refueling envelope has an upper limit 32a, a lower limit 32b, side limits 32c, and forward and rear limits 32d. The limits of the control limit are indicated at 34a, b, c, and d. The manner in which the main components of the present invention cooperate to provide adequate viewing for proper control of the boom 12 within the envelope limits is particularly significant in the present invention and will be described later herein.

Figure 3:
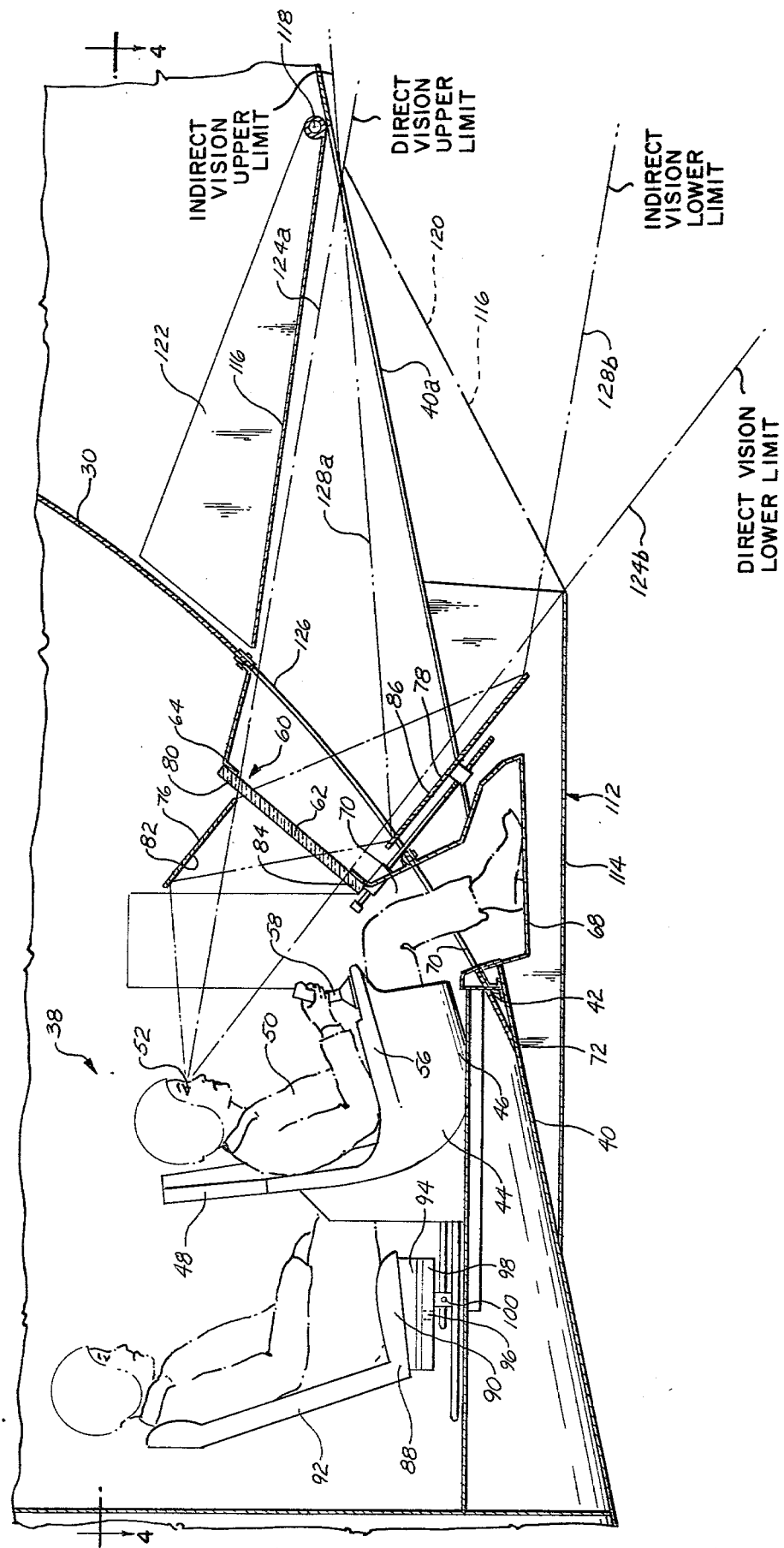
FIG. 3 is a side elevational view of the refueling boom operating station of the present invention.
Figure 4:
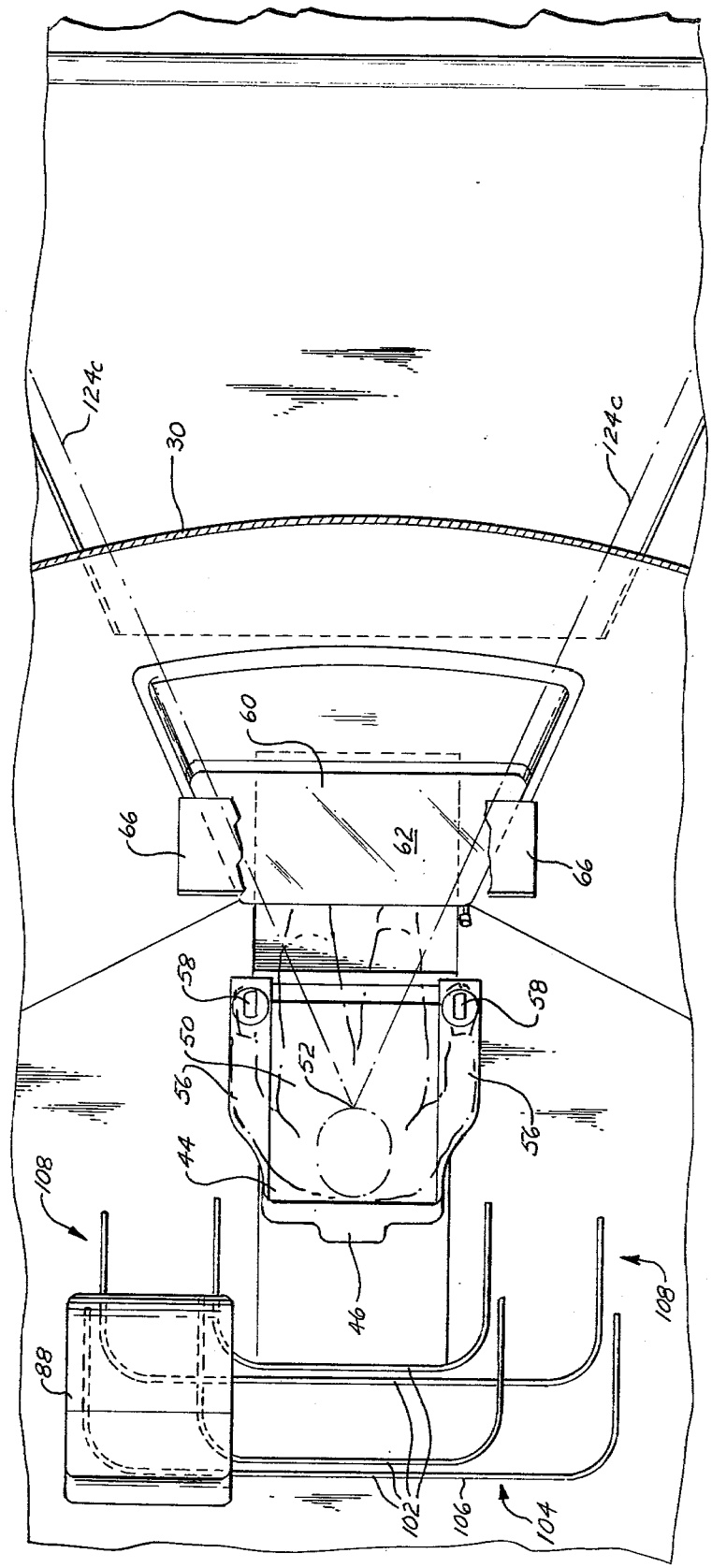
FIG. 4 is a top plan view of the station shown in FIG. 3.
Figure 5:
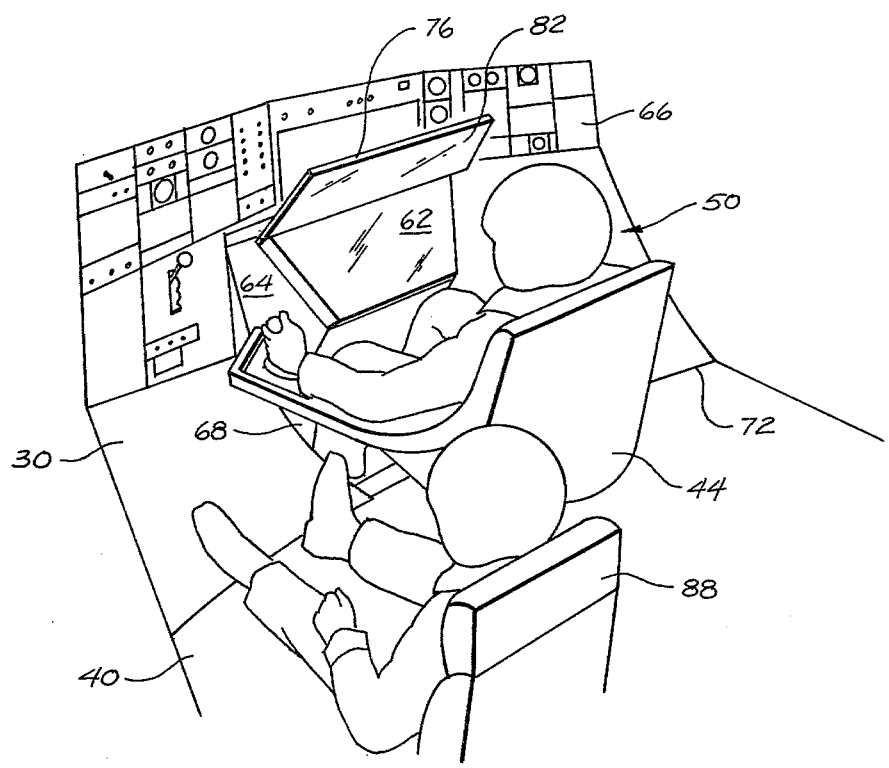
FIG. 5 is a perspective view of the refueling boom operating station of the present invention.

With reference to FIGS. 3, 4 and 5 the main components of the operating station of the present invention will now be described. The operating station, generally designated 38 is located in a lower rear portion of the aircraft and immediately above and forward of the location of the lower edge 42 of the rear pressure bulkhead 30.

There is an operator's seat 44 comprising a seat platform 46 and a backrest 48 extending upwardly and forwardly from the rear of the seat platform 46. The seat platform 46 and backrest 48 are so located that when an air refueling operator (indicated at 50) is positioned on the seat 44 so as to be supported by both the platform 46 and the backrest 48, an eye reference point 52 located for viewing in a rearward direction is established for the operating station 38. As its name indicates, this "eye reference point" coincides with the location of the eyes of the operator 50 when the operator 50 is properly positioned on the seat 44. To maintain a substantially constant eye reference point and make allowance for operators 50 of greater or lesser body size, the seat 44 is adjustable within moderate limits both vertically and longitudinally. Since such adjustment mechanisms are well known in the prior art, the one used here will not be described in detail.

The operator's seat 44 is further provided with two armrests 56 positioned laterally outwardly of the seat platform 46, with each armrest 56 having a related control handle 58 thereon positioned so that the two handles 58 can be conveniently grasped by the operator 50 when he is positioned with his back against the backrest 48. Also, the armrests 56 with the handles 58 are positioned downwardly and off to the side a sufficient distance so that they would in no way interfere with the operator's view of the boom 12.

Positioned a short distance (e.g. about two feet) rearwardly of the eye reference point 52 is a window structure 60 made up of a transparent window portion 62 and a surrounding window frame 64. The window portion 62 and frame 64 are constructed such that they will maintain the pressure within the pressurized compartment forward of the rear pressure bulkhead 30. Therefore, the window 62 and frame 64 are in essence a continuation of the pressure bulkhead 30 and are constructed to withstand the pressure differentials concurrent therewith, with the walls of the frame 64 extending forwardly from the spherical plane of the bulkhead 30. There is an instrument panel 66 which extends laterally from both sides at about the same longitudinal location as the operator's knees, with a space above the operator's knees between the instrument panel portions being arranged so that he may have a clear view of the window structure 60.

A leg accommodating structure 68 extends downwardly and rearwardly through and beyond the rear pressure bulkhead 30 and the lower fuselage skin 40. The leg accommodating structure (called a leg well) has a forward entrance portion 70 at a longitudinal location approximately beneath the instrument panel 66 and just rearward of the connection between the rear pressure bulkhead 30 and the lower fuselage skin 40, indicated at 72. The leg well 68 is preferably made as small as practicable which will permit the legs and feet of an operator to be contained comfortably therein, so that the opening in the rear pressure bulkhead 30 and the lower fuselage skin 40 caused by the leg well is as small as possible. The leg well structure 68 is, as in the case of the window structure 60, contiguous with the rear pressure bulkhead 30 and therefore must be constructed to withstand the pressure differentials between the pressurized and non-pressurized portions of the aircraft interior.

An auxiliary viewing system 74 is positioned adjacent the window structure 60 comprising an upper forwardly positioned mirror 76 and a lower rearwardly positioned mirror 78. The upper mirror 76 extends from an upper forward edge 80 of the transparent window portion 62 upwardly and forwardly at about a forty-five degree angle from the horizontal. Thus, the upper mirror 76 provides a downwardly and rearwardly directed reflecting surface 82. The lower mirror 78 extends downwardly and rearwardly from a lower rearward edge 84 of the transparent window portion 62, with a reflective surface 86 being directed upwardly and rearwardly. As will be disclosed more fully hereinafter, the function of these two mirrors 76 and 78 is to provide an indirect (i.e. reflected) view of the upper portion of the control limit area of the boom 12. The lower mirror 78 can be adjusted about a horizontal axis passing through the plane of the mirror to either raise or lower the indirect view to a moderate extent.

The operating station 38 is arranged to include at least one, and possibly two, additional seats 88 which can be used for one or more observers or instructors. In the following description, each of the seats 88 will be designated an "observer's seat." Each observer's seat 88 is or may be of conventional configuration and thus comprises a seat platform 90 and a backrest 92. The seat platform 90 is mounted to an intermediate plate 94 which is in turn rotatably mounted about a vertical pivot axis 96 to an underlying base 98. The base 98 is supported by four swivel mounted rollers 100, each of which is in turn mounted to one of four related rail members 102 of a track mechanism generally designated 104.

The track mechanism 104 is generally "U" shaped and thus comprises a laterally extending base portion 106, positioned immediately forward of the operator's seat 44, and two leg portions 108 extending on opposite sides of the operator's seat 44. Each observer's seat 88 is mounted to its related intermediate plate 94 for limited horizontal linear movement (e.g. about 8 inches or so) relative to the plate 94 so that it could be moved from the pivot axis 96 either closer to or further from the operator's seat 44. This lineal movement, in combination with the rotational movement of the observer's seat 88 about the pivot axis 96, and also in combination with the arrangement of the track mechanism 104, permits each observer's seat 88 to be positioned quite conveniently in a variety of locations adjacent the back and sides of the operators's seat 44.

While the track mechanism 104 is or may be of conventional design, the particular track mechanism 104 disclosed herein is believed to be an improvement over conventional track mechanisms, and is described in U.S. patent application Ser. No. 866,628, filed Jan. 3, 1978 being entitled "SEAT TRACK MECHANISM FOR AIRCRAFT REFUELLING BOOM OPERATING STATION," now U.S. Pat. No. 4,184,656 the inventor being Tendon F. Wakeley, and the application being assigned the same assignee as the present application. Since a detailed understanding of this particular track mechanism 104 is not essential to an understanding of the inventive features of the present invention, and since the present invention could be practiced by use of conventional track mechanism known in the prior art, a detailed description of this novel track mechanism 104 will not be included.

To analyze the operation of the present invention, reference is made to FIG. 3. Immediately beneath the operator 50 and continuing rearwardly therefrom, there is a fairing structure 112 which is an outward and downward bubble-like extension of the outer fuselage skin 40. This fairing 112 has a forwardly positioned stationary portion 114 and a rearwardly positioned moveable portion 116 which pivots about pivot point 118. The moveable portion 116 is moveable between a first closed position indicated at 120, and second open position indicated at 122. There is an aperture defined by the lower fuselage skin 40, indicated herein generally and designated 40a which extends from approximately the pivot point 118 forwardly to the lower mirror 78. When the moveable portion 116 of the fairing 112 is pivoted upwardly to its second open position, the operator 50 has a direct view of the exterior of the tanker aircraft 10 rearward of the operating station 38.

It can be seen that the plane of the upper direct viewing limit 124a passes from the eye reference point 52 through a location below the lower edge of the mirror 76, through an upper portion of the window portion 62, through the aperture 126 defined by the rear pressure bulkhead 30, and below the moveable portion 116 of the fairing 112 when in its open position 122 immediately forward of the pivot point 118. The plane of the lower direct viewing limit 124b passes from the eye reference point 52 through the window portion 62, through the aperture 40a defined in lower fuselage skin 40, and immediately rearward of the stationary portion 114 of the fairing 112.

Further with reference to FIG. 3 it can be seen that the upper and lower limit 128a and 128b of the indirect viewing area extends divergently from respectively the upper and lower edges of the reflective surface 86 of the mirror 78 and include an area just above the direct viewing area upper viewing limit 124a. It will be noted that the indirect viewing limits increase the operator's effective vision limit only above, and not below, that available by direct vision. There is a band of overlap between the upper direct viewing limits 124a and the lower indirect viewing limit 128b.

With respect to the direct viewing side limits 124c reference is made to FIG. 4. The side limits are determined essentially by the lateral limits of the direct viewing portion of the window structure 62, and the lateral width of the aperture 40a defined in the lower fuselage skin.

It is to be understood that various modifications can be made without departing from the scope of the teachings of the present invention.

What is claimed is:

1. In an aircraft comprising a fuselage having an outer fuselage skin, a forward end and a rear end, a longitudinal center line and a transverse axis, and having
   a. a refueling boom extending rearwardly from said aircraft and having a refueling envelope within which said boom operates during a refueling operation, said envelope having upper, lower and side envelope boundaries, and
   b. a rear pressure bulkhead at the rear end of said fuselage, said bulkhead defining a window aperture therethrough,
   the improvement comprising an operating station for a boom operator, said station comprising:
   a. an operator seat at a rear portion of said fuselage at a location forward of said bulkhead, said seat arranged to establish a rearwardly directed eye reference point for an operator positioned in said seat,
   b. a leg accommodating structure extending rearwardly from said operator's seat in a manner to receive legs of an operator positioned in said seat, said leg accommodating structure being provided contiguous with said rear pressure bulkhead and extending through and beyond said rear pressure bulkhead,
   c. a window structure positioned rearwardly of said eye reference point and forward of said rear pressure bulkhead at a location above said leg accommodating structure, said window structure providing said operator with a direct viewing area defined by upper, lower and side viewing limits,
   d. said operator's seat, leg accommodating structure and said window structure being positioned and arranged relative to one another and relative to said aperture defined by said rear pressure bulkhead in a manner that
      1. an upper edge of said window structure and an upper portion of said aperture defined by said rear pressure bulkhead are located at least as high as a plane extending from the upper envelope boundary to the eye reference point,
      2. side edge portions of said window structure and said aperture defined by said rear pressure bulkhead are located at least as far laterally as planes extending from both side envelope boundaries to the eye reference point, and
      3. a lower viewing limit of said window structure and a lower edge portion of said aperture defined by said rear pressure bulkhead are located at least as low as a plane extending from the lower envelope boundary to the eye reference point.

2. The improvement as recited in claim 1, where said station further comprises an instrument panel positioned at a longitudinal location generally coinciding with said window structure, said leg accommodating structure extending rearwardly beyond said instrument panel.

3. The improvement as recited in claim 1, wherein said seat is provided with a pair of arm rests positioned laterally on opposite sides of said seat, and an operating handle for controlling said boom at each of said arm rests.

4. The improvement as recited in claim 1, wherein said seat is both horizontally and vertically adjustable to accommodate operators of different body sizes, so as to be capable of maintaining a substantially constant eye reference point.

5. The improvement as recited in claim 1, wherein there is a track mechanism proximate said operator seat, said track mechanism having a first track portion extending along said transverse axis at a location forward of said operator seat and having at least one second track portion extending generally longitudinally and along one side of said operator seat, said improvement further comprising a second seat, said second seat being mounted for movement along said track mechanism, whereby an observer or instructor is able to be positioned in said second seat and obtain a view of said refueling envelope through said window structure.

6. The improvement as recited in claim 1, wherein there is a track mechanism extending along said transverse axis at a location forward of said seat and having a pair of second track portions extending generally longitudinally and on opposite sides of said operator seat, said improvement further comprising a second seat, said second seat being mounted for movement along said track mechanism, whereby an observer or instructor is able to be positioned in said second seat and obtain a view of said refueling envelope through said window structure.

7. The improvement as recited in claim 6, wherein said second seat has a base member mounted to said track mechanism, and said second seat is mounted for rotation about a vertical axis relative to said base member and for horizontal lineal movement with respect to said base member, whereby said second seat can be moved closer to or further from said operator seat and rotated to a desired position for proper observation of said refueling envelope.

8. The improvement as recited in claim 1, wherein said leg accommodating structure comprises a rearward and downward extension of said rear pressure bulkhead, said leg accommodating structure having an entrance portion positioned at approximately a knee location of an operator positioned in said seat.

9. The improvement as recited in claim 8, wherein said leg accommodating structure extends through and below said outer fuselage skin rearward of said rear pressure bulkhead, said leg accommodating structure defining a pressurized enclosure therein in communication with an interior portion of said aircraft fuselage adjacent said operator's seat.

10. The improvement as recited in claim 9 wherein said outer fuselage skin is provided with a fairing on a lower portion thereof, said fairing being located longitudinally on said aircraft approximately below said operator seat and extending rearwardly therefrom at least as far as said upper direct viewing limit.

11. The improvement as recited in claim 10, wherein said fairing further comprises a stationary forward portion and a movable rearward portion, said movable rearward portion having a first closed position and a second open position.

12. The improvement as recited in claim 11, wherein said fairing extends outwardly and downwardly from said outer fuselage skin, and said forward stationary portion adapted to envelope said leg accommodating structure, and said rearward movable portion adapted to pivot from said first closed position upwardly into said fuselage to said second open position about a rearwardly positioned pivot point located at said outer fuselage skin.

13. The improvement as recited in claim 12, wherein said outer fuselage skin defines a fuselage aperture therethrough, said fuselage aperture extending forwardly from said pivot point of said movable portion at least as far as said lower viewing limit of the direct viewing area.

14. The improvement as recited in claim 13, wherein when said movable portion of said fairing is in the second open position, said boom operator has upper and lower direct vision limits of said refueling envelope through said window structure and said aperture defined by said rear pressure bulkhead, through said aperture defined by the outer fuselage skin, and through that portion of said fairing vacated by said moveable portion.

15. The improvement as recited in claim 1, further comprising an auxiliary viewing device, which auxiliary viewing device comprises a first mirror means located proximate a lower edge of said window structure and having a reflective surface directed upwardly and rearwardly, and a second mirror means positioned proximate an upper edge of said window structure and having a reflective surface directed downwardly and forwardly, said first and second mirror means being so positioned relative to said eye reference point that light from an area above said direct viewing area is reflected by said first and second mirror means to said eye reference point.

16. The improvement as recited in claim 15, wherein said first mirror means extends downwardly and rearwardly from a lower edge of said window structure, and said second mirror means extends upwardly and forwardly from an upper edge of said window structure.

17. The improvement as recited in claim 1, wherein:
a. said leg accommodating structure has an entrance portion positioned at approximately a knee location of an operator positioned in said seat, and said window structure is located longitudinally at approximately said knee location,
b. said seat is provided with a pair of arm rests positioned laterally on opposite sides of said seat, and an operating handle for controlling said boom at each of said arm rests,
c. said seat is both horizontally and vertically adjustable to accommodate operators of different body sizes, so as to be capable of maintaining a substantially constant eye reference point,
d. said improvement further comprises an auxiliary viewing device, which auxiliary viewing device comprises a first mirror means located proximate a lower edge of said window structure and having a reflective surface directed upwardly and rearwardly, and a second mirror means positioned proximate an upper edge of said window structure and having a reflective surface directed downwardly and forwardly, said first and second mirror means being so positioned relative to said eye reference point that light from an area above said direct viewing area is reflected by said first and second mirror means to said eye reference point.

18. The improvement as recited in claim 17, wherein:
a. there is a track mechanism having a first track portion extending along said transverse axis at a location forward of said seat and having a pair of second track portions extending generally longitudinally and on opposite sides of said operator seat, said improvement further comprising a second seat, said second seat being mounted for movement along said track mechanism, whereby an observer or instructor is able to be positioned in said second seat and obtain a view of said refueling envelope through said window,
b. said second seat has a base member mounted to said track mechanism, and said second seat is mounted for rotation about a vertical axis relative to said base member and for horizontal lineal movement with respect to said base member, whereby said second seat can be moved closer to or further from said operator seat and rotated to a desired position for proper observation of said refueling envelope.

* * * * *